(12) United States Patent
De Morentin et al.

(10) Patent No.: US 8,250,472 B2
(45) Date of Patent: Aug. 21, 2012

(54) DOCUMENTATION SYSTEM (75) Inventors: Eric Martinez De Morentin, Manly (AU); Mark Carl Hampton, Newton (AU); John Anthony James, Mosman (AU)

(73) Assignee: International Business Machines Corporation, Armonk, NY (US)

( * ) Notice: Subject to any disclaimer, the term of this patent is extended or adjusted under 35 U.S.C. 154(b) by 970 days.

(21) Appl. No.: 11/962,842

(22) Filed: Dec. 21, 2007

(65) Prior Publication Data

US 2009/0164898 A1 Jun. 25, 2009

(51) Int. Cl.
*G06F 3/00* (2006.01)
(52) U.S. Cl. ........................................ 715/714; 715/705
(58) Field of Classification Search .................. 715/705, 715/714, 707–708, 711, 715, 745; 707/758, 707/767
See application file for complete search history.

(56) References Cited

U.S. PATENT DOCUMENTS

| 6,133,917 | A  | * | 10/2000 | Feigner et al. ................ 715/708 |
| 6,208,338 | B1 |   | 3/2001  | Fischer et al. ................ 345/338 |
| 6,385,196 | B1 | * | 5/2002  | Hayball et al. ................ 370/356 |
| 7,024,658 | B1 |   | 4/2006  | Cohen et al. .................. 717/117 |
| 7,353,246 | B1 | * | 4/2008  | Rosen et al. ............. 707/999.01 |
| 7,836,401 | B2 | * | 11/2010 | Hathaway ..................... 715/714 |
| 2002/0054138 | A1 |   | 5/2002  | Hennum ...................... 345/804 |
| 2003/0028513 | A1 |   | 2/2003  | Pawar ............................ 707/1 |
| 2006/0265232 | A1 |   | 11/2006 | Katariya et al. .................. 705/1 |

* cited by examiner

*Primary Examiner* — Tuyetlien Tran
*Assistant Examiner* — Truc Chuong
(74) *Attorney, Agent, or Firm* — Suiter Swantz pc llo (57) ABSTRACT

A first application executes in an identified state. The first application broadcasts the identified state. The broadcasted identified state of the first application is received by a second application. The second application determines contextual content based on the received identified state of the first application. The contextual content is displayed.

21 Claims, 6 Drawing Sheets

DOCUMENTATION SYSTEM

TECHNICAL FIELD

The disclosure generally relates to the field of computer software/hardware, and more particularly to a contextual documentation system for a software/hardware application, such as a contextual help program.

BACKGROUND

Most software and/or hardware products/applications are designed to include some type of contextual documentation, such as the help or customer assistance facility for a program. Contextual documentation provides relevant information regarding the portion of the application currently being utilized or executed by a user. Contextual documentation provides a user with direct access to training or help facilities that are relevant to the portion of the application the user is actively running. However, contextual documentation systems are usually designed within the software and/or hardware application and therefore, may be inconsistent in appearance and content across multiple versions of the software and/or hardware application. Moreover, the contextual documentation system may not be utilized with other applications. Additionally, the application cannot be utilized before drafting the context specific information to prepare more accurate content. Contextual documentation systems may also prevent persons other than the developer from designing contextual documentation for the application.

SUMMARY

The disclosure is directed to a method for contextual documentation, a computer readable medium comprising computer readable instructions, a method for making an application, and a contextual documentation system.

The method for contextual documentation comprises receiving an identified state of a first application using a second application, determining contextual content to display utilizing the second application based on the received identified state of the first application, and displaying the contextual content.

The computer readable medium comprising computer readable instructions which, when executed, perform the steps of receiving an identified state of a first application using a second application, determining contextual content to display utilizing the second application based on the received identified state of the first application, and displaying the contextual content.

The method for making an application comprises identifying at least one state to form at least one identified state and inserting broadcasting code at each of the at least one identified state for broadcasting the at least one identified state to a contextual content generating application, external to the application, which determines contextual content based on the at least one identified state it receives so that the contextual content may be displayed.

The contextual documentation system comprises a processor configured for identifying an executing state and for broadcasting the executing state of an application; at least one context generating application, external to the application, for receiving the broadcasted identified executing state of the application and determining contextual content based on the received identified executing state of the application so that the contextual content may be displayed; and an interface, communicatively coupled to the processor and the at least one context generating application, suitable for communicating the identified executed state between the processor and the at least one context generating application.

It is to be understood that both the foregoing general description and the following detailed description are exemplary and explanatory only. The accompanying drawings, which are incorporated in and constitute a part of the specification, illustrate examples and together with the general description, serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
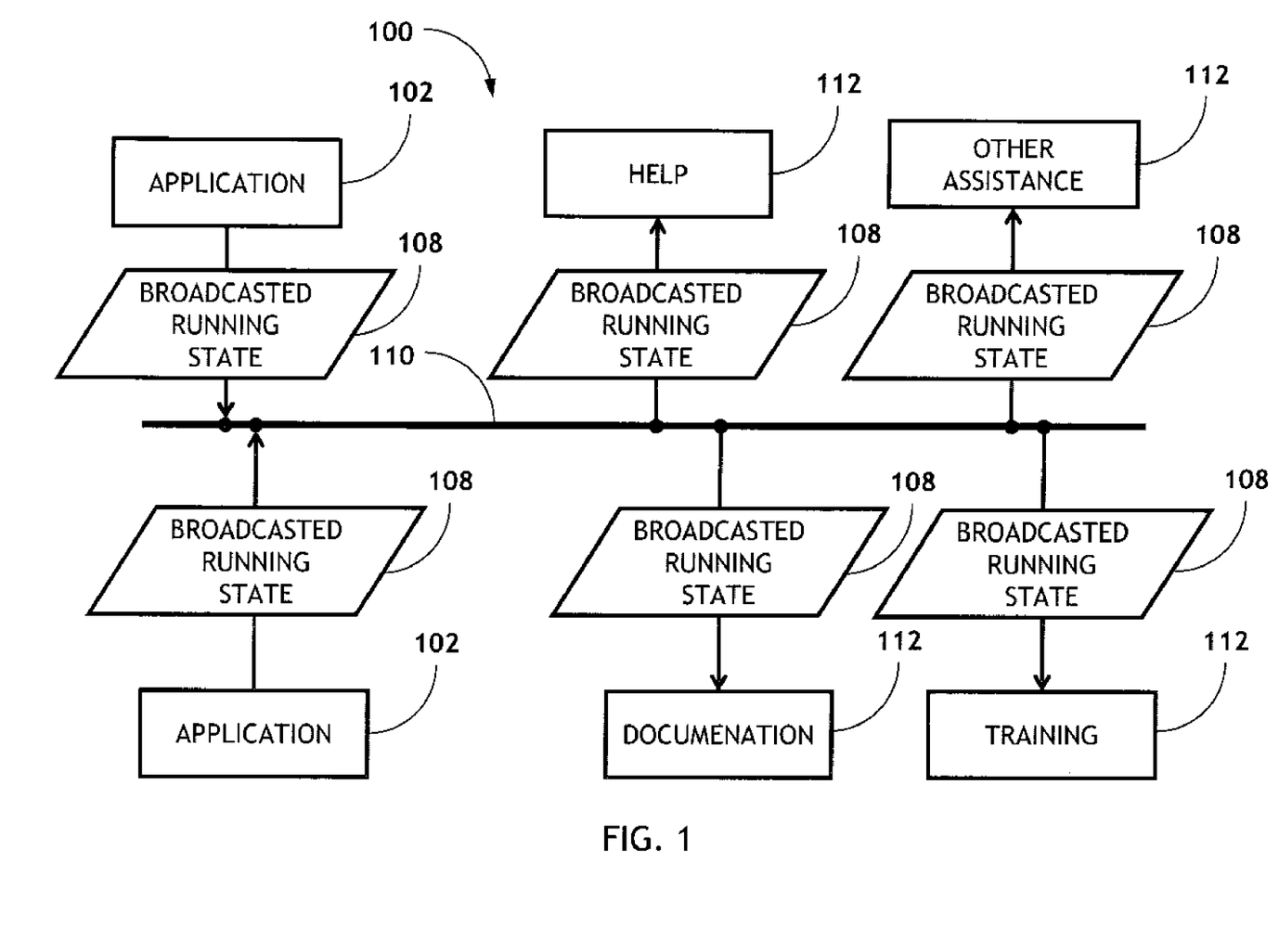
FIG. 1 is a block diagram illustrating a contextual documentation system.
Figure 2:
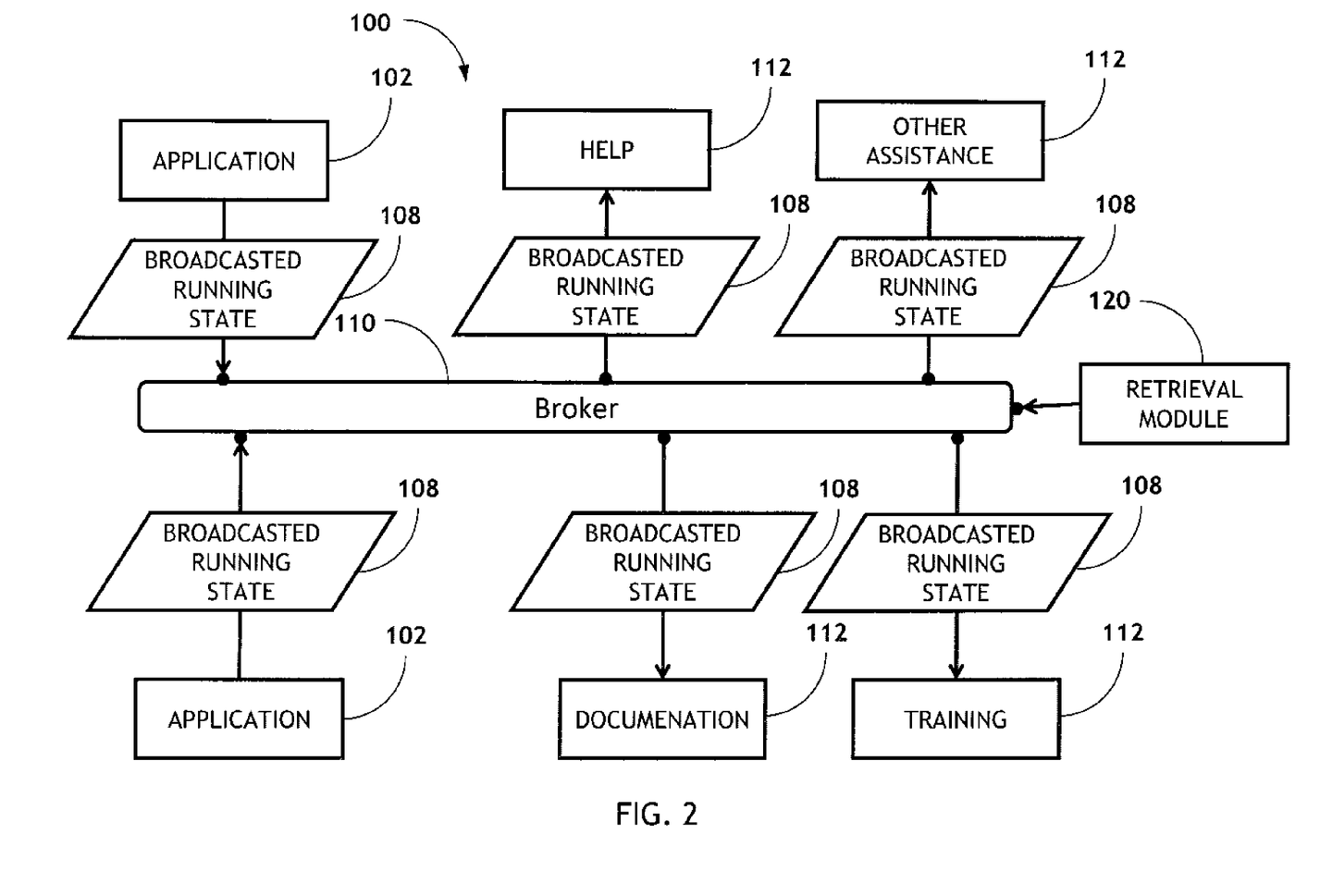
FIG. 2 is a block diagram illustrating a contextual documentation system.
Figure 3:
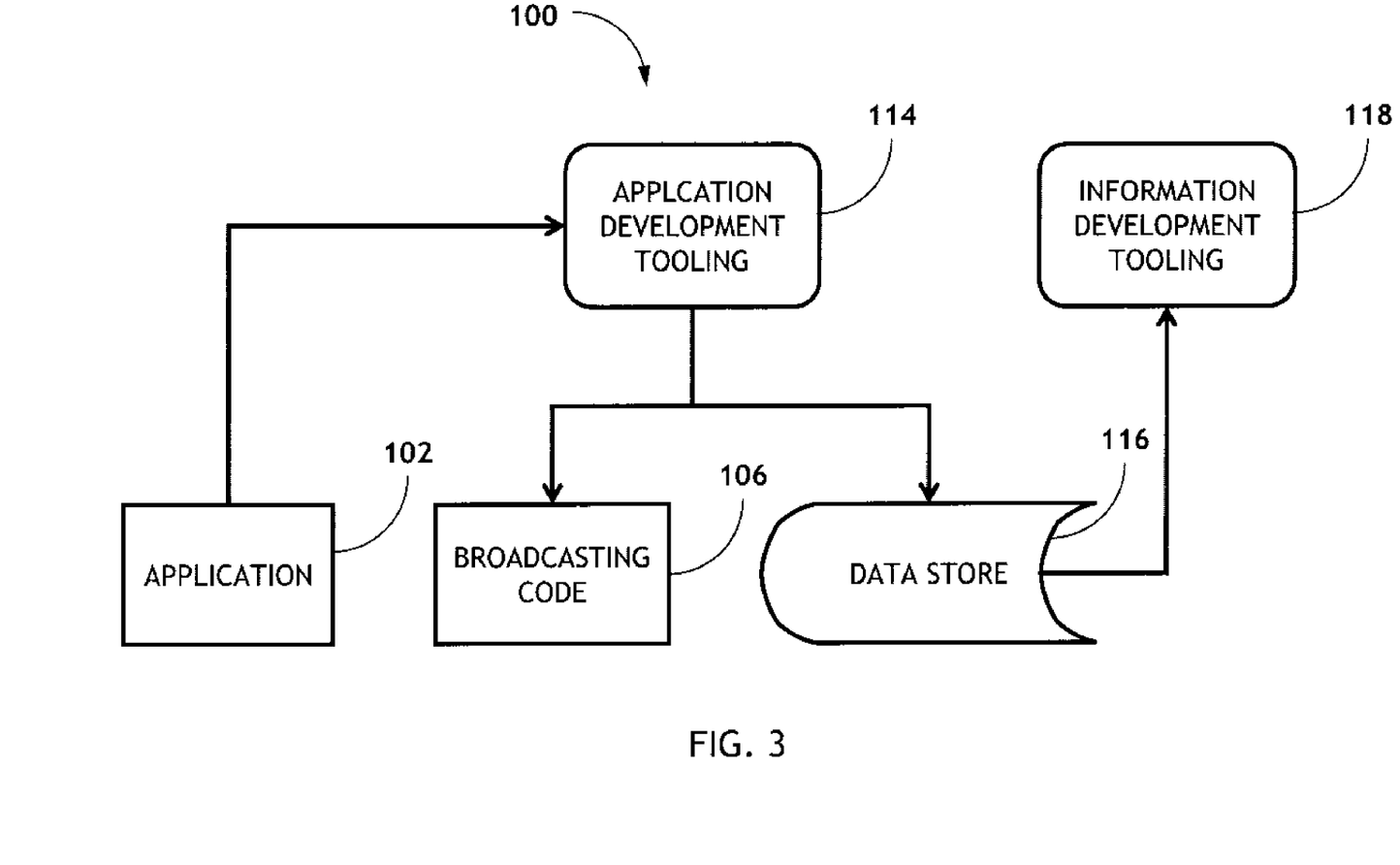
FIG. 3 is a block diagram illustrating a contextual documentation system.

Referring to FIGS. 1 through 3, a contextual documentation system 100 is shown. The contextual documentation system 100 may allow contextual content to be developed independently of a software and/or hardware application 102. The contextual documentation system 100 may allow a party other than the developer of the application 102 to develop the contextual content for the software and/or hardware application 102. A software application may generally be defined as a process/program that executes within a specified resource space (e.g., an assigned space including memory and protected access to other resources such as files and I/O streams). Further, it will be appreciated that a software application may be implemented in a multithreaded environment (i.e., an environment where an application may be executed with a number of threads, where each thread shares the specified resource space of its software application). Alternatively, a software application may be executed in a single-threaded environment, where the application is the implementation of a single process thread. The contextual documentation system 100 may utilize one or more contextual content generating applications, which each may include a plurality of contextual content generating modules 112, with the software and/or hardware application 102. Further, the contextual content generated by the one or more contextual content generating applications, which each may include contextual content generating modules 112, may be designed for multiple software and/or hardware applications 102.

Figure 4:
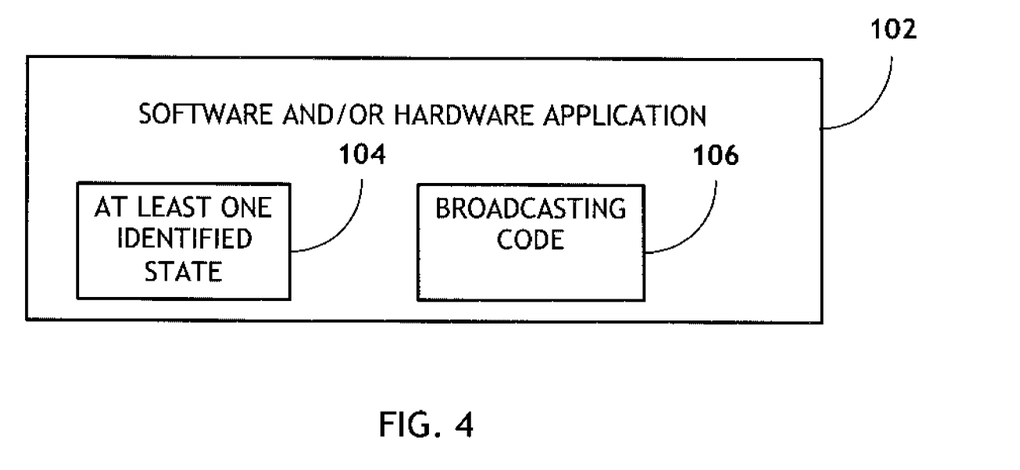
FIG. 4 is a block diagram illustrating a software and/or hardware application of the contextual documentation system.

Referring to FIG. 4, a block diagram of a software and/or hardware application 102 of the contextual documentation system 100 is shown. The software and/or hardware application 102 comprises at least one identified application state 104 and a broadcasting code 106 inserted at each of the at least one identified states 104. The identified state 104 is a specific portion of the software and/or hardware application, which can be executed by the software and/or hardware application, that is recognized and then identified by the developer as being important and/or interesting during the development of the software and/or hardware application 102. The identified state may have a name and an associated set of topics. The developer may make as many topics for each identified state available as the developer desires. A topic comprises a type and a key. The type may comprise a button, a screen, a task, a concept, or any other suitable type of topic for an identified state 104 in a contextual content system 100. The key may comprise a "new button", a "delete dialog", a "publishing concept", or any other suitable key for an identified state 104 in a contextual content system 100.

After identifying an application state the developer inserts the broadcasting code 106 at the identified state 104 during the development of the software and/or hardware application. The broadcasting code 106 is suitable for sending and/or broadcasting an identified state of the software and/or hardware application that is currently being run by a user.

The software and/or hardware application 102 of the contextual documentation system 100 may be a computer readable medium comprising computer readable instructions which, when executed, perform the steps of identifying a running state and means for broadcasting the running state. The computer readable medium comprising computer readable instructions may further comprise instructions which, when executed, perform the step of storing a list of all identified states.

Figure 5:
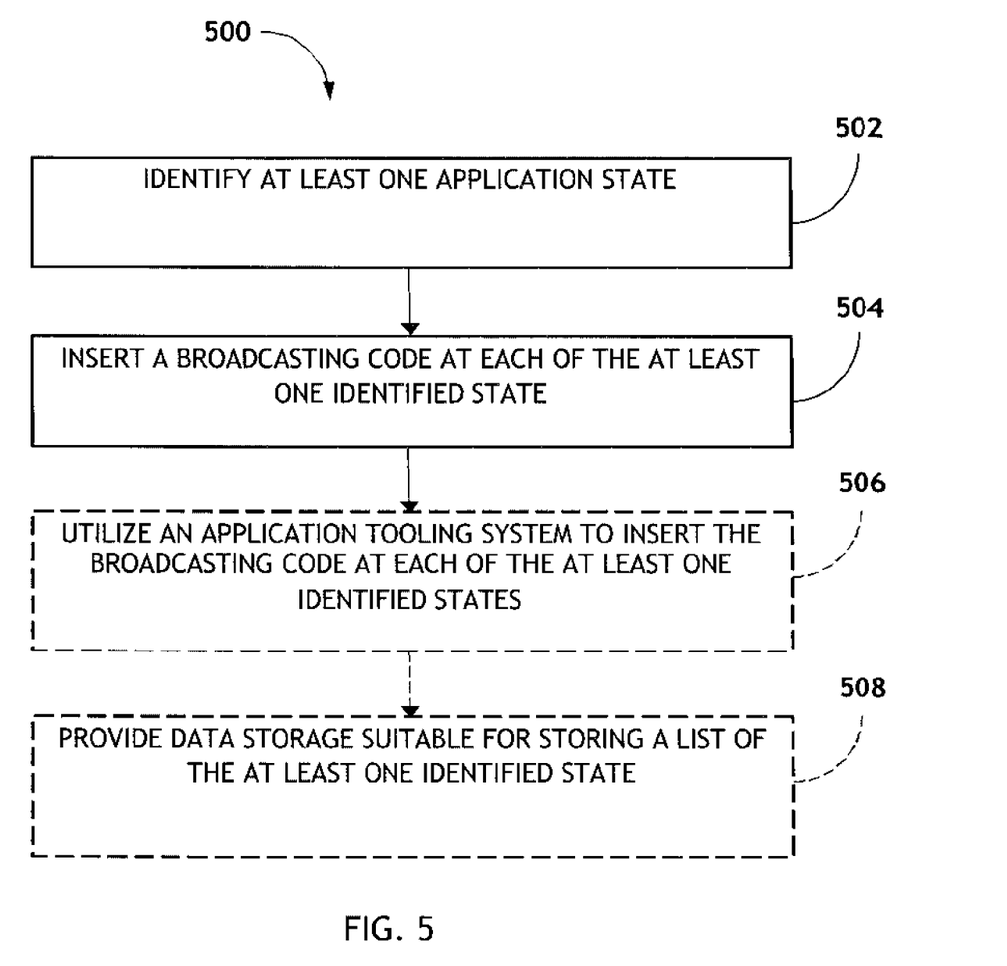
FIG. 5 is a method diagram illustrating a method for making a software and/or hardware application.

Referring to FIG. 5, a method diagram of a method for making a software and/or hardware application 500 is shown. Method 500 identifies at least one application state, 502. Method 500 inserts a broadcasting code at each of the at least one identified state, 504. Method 500 may utilize an application tooling system to insert the broadcasting code at each of the at least one identified states, 506. Method 500 may provide data storage suitable for storing a list of the at least one identified state, 508.

The software and/or hardware application 102 and the contextual documentation system 100 and the methods thereof are operational with numerous other general purpose or special purpose computing system environments or configurations. Well known computing systems, environments, and/or configurations that may be suitable for use with the software and/or hardware application 102 and the contextual documentation system 100 and the methods thereof are personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like. This list is not restrictive. It is contemplated that any suitable devices for utilizing the software and/or hardware application 102 may utilized without departing from the scope and intent of the disclosure.

The software and/or hardware application 102, the contextual content generating application, which may include one or more contextual content generating modules 112, and/or any other application or module described herein may be described in the general context of computer-executable instructions, such as program modules, being executed by a computer. Generally, program modules and/or applications include routines, programs, objects, components, data structures, and the like that perform particular tasks or implement particular abstract data types. The applications and modules may also be practiced in distributed computing environments where tasks are performed by remote processing devices that are linked through a communications network. In a distributed computing environment, program modules may be located in both local and remote computer storage media including memory storage devices.

The contextual documentation system 100 comprises the application 102, a broadcasted running state 108, and an interface 110, as illustrated in FIGS. 3 and 4. The application 102 broadcasts the running state 108. The broadcasted running state 108 comprises the state the application is currently running. The broadcasted running state 108 may further comprise other information, such as the identified running state's name and associated topic(s). The interface 110 is a medium utilized to broadcast the running state 108. The interface 110 may be selected from a group of a bus and a broker or any other suitable medium for broadcasting a running application state in the general purpose or special purpose computing system environments or configurations. The bus may comprise a message bus, implemented in software and/or hardware, for messages to be placed on and delivered via the message bus. The bus may comprise a local bus (implemented within a computing system) and/or a network bus implemented over a network including, but not limited to, a local area network (LAN) and/or the Internet. The broker may handle communication of states rather than a bus. Applications 102 may directly contact a broker and notify it of their state. The broker may then contact the contextual content generating application, which may include one or more contextual content generating modules 112 (such as a help module, a documentation module, a training module), and notify the contextual content generating application of the state change. The broker may be utilized rather than a bus where no bus exists or where use of a bus is not desirable.

The contextual documentation system 100 may further comprise an application development tooling 114, a data store 116, an information development tooling 118, and/or a retrieval module 120.

The application development tooling 114 may be utilized to insert the state broadcasting code at each of the at least one identified states during the formation of the application 102, as illustrated in FIG. 5.

The contextual content generating application, which may include one or more contextual content generating modules 112, may receive the broadcasted running state 108, as illustrated in FIGS. 3 and 4. Multiple contextual content generating applications, which each may include one or more contextual content generating modules 112, may listen for the broadcasted running state 108. The contextual content application may change or generate content based on the received broadcasted running state 108 of the application 102. Any of the contextual content generating applications may generate and/or provide contextual content. The contextual content generating application may generate content to provide a help system, a documentation system, a training system, an assistance system, an informational system, and/or any other suitable system for an application with identified states. Because multiple contextual content generating applications, each of which may include one or more contextual content generating modules 112, may listen for the broadcasted running state 108, the user may have available multiple views and/or contexts of appropriate content at the right time and place. Furthermore, the user may determine the training, help, and/or informational contextual content the user desires.

The contextual content generating application, which may include one or more contextual content generating modules 112, may be developed by the developer of the application 102 or by another or third party developer. Third party created contextual content generating applications or developer created contextual content generating applications may be formed after the application is written. Moreover, a third party developer may develop appropriate contextual content for each of the at least one state of the application 102 by receiving a list of each of the at least one state of the application. The data store 116 may be suitable for storing a list of each of the at least one state of the application. The information development tooling 118 may be utilized by a third party to retrieve the list of each of the at least one state of the application, as illustrated in FIG. 5. The information development tooling 118 may be suitable for querying the data store 116 to determine the list of each of the at least one state of the application, as illustrated in FIG. 5. The information development tooling 118 may also be suitable for associating already formed contextual content with these identified application states.

The contextual content generating application and/or the application 102 may include a retrieval module 120. The retrieval module 120 may be utilized by the contextual documentation system 100 to retrieve contextual content based on the running state 108, as illustrated in FIG. 4. However, the retrieval module 120 must be capable of retrieving the contextual content in the given runtime for the contextual documentation system 100. The retrieval module 120 may be utilized by the contextual documentation system 100 to retrieve contextual content from a contextual content generating module 112 of the contextual content generating application and/or a different contextual content generating application. The retrieval module 120 may selectively choose the contextual content from one contextual content generating module 112 over another contextual content generating module 112, such as choosing a help system designed by the developer over a third party designed help system. If desired, the retrieval module 120 may always utilize the unselected contextual content from the contextual content generating module 112 at later time. However, the retrieval module 120 may retrieve the contextual content generated, developed, and/or associated by all of the contextual content generating modules 112 found in the computer or system environment. As used herein "changed contextual content" or "changing contextual content" refers to at least one of generating, developing, and/or associating contextual content in the contextual content generating modules 112. The retrieval module 120 may also be suitable for brokering the application states and retrieving the generated, developed, and/or associated contextual content. The retrieval module 120 may be installed separately from the software and/or hardware application to support multiple applications or may be embedded in the software and/or hardware application.

Figure 6:
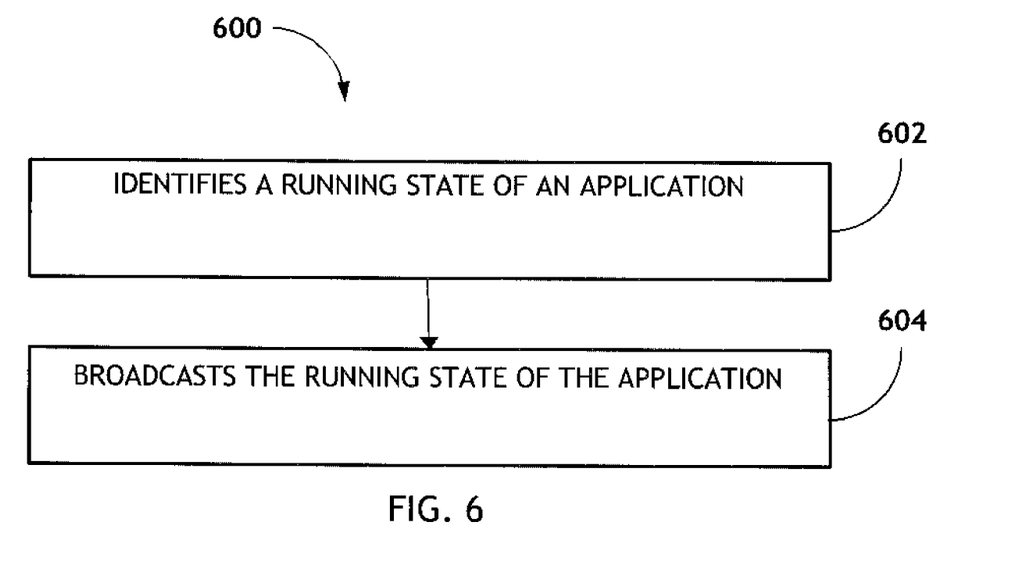
FIG. 6 is a method diagram illustrating the method for contextual documentation.

Referring to FIG. 6, a block diagram of the method for contextual documentation 600 is shown. Method 600 identifies a running state of an application, 602. Method 600 broadcasts the running state of the application, 604. Method 600 may store a list of all identified states of the application. Method 600 may query to determine the list of all the identified states of the application. Method 600 may develop contextual content for each of the identified states of the application. Method 600 may associate already formed contextual content with each of the identified states of the application. Method 600 may receive the broadcasted running state of the application. Method 600 may further change contextual content based on the received broadcasted running state. Method 600 may further retrieve the changed contextual content based on the received broadcasted running state. The retrieved contextual content may be contextually appropriate for the running application state.

Method 600 may be performed by system 100.

EXAMPLE 1

The application may be a word processing program. The user may be accessing a "find" function (a query and/or search function) in the word processing program on a personal computer system. The find function may be an identified state of the word processing program. Therefore, when the find function is running, a signal may be broadcasted from the application across a bus on the user's computer system. A contextual content generating module, such as training system may be found on the user's computer system. The training system may receive the broadcasted running state of the application. The training system may change contextual content based on the received running state. The training system may generate content that provides helpful instruction on how to use the find function. The application may comprise a retrieval module. The retrieval module may locate and retrieve the changed contextual content or the training instructions for utilizing the find function on the application. The user is presented with the training instructions or contextual content for utilizing the find function on the application while running the find function on the application. The retrieval of the contextual content is performed before the word processing program executes another identified state. The retrieval module may be a module separate from the application.

EXAMPLE 2

The application may be a word processing program. The user may be utilizing a macro function in the word processing program on a personal computer system. The macro function may be an identified state of the word processing program. Therefore, when the macro function is running, a signal may be broadcasted from the application across a bus on the user's computer system. Multiple contextual content generating applications, such as training system and a documentation system may be found on the user's computer system. The multiple contextual content generating applications, such as the training system and the documentation system, may receive the broadcasted running state of the application. The training system and the documentation system may change contextual content based on the received running state. The training system may generate content that provides training instructions on how to use the macro function. The documentation system may generate content that provides documentation on the macro function. The application may comprise a retrieval module. The retrieval module may locate and retrieve the changed contextual content, the training instructions for utilizing the macro function on the application, and/or documentation on the macro function. The user is presented with the changed contextual content, the training instructions for utilizing the macro function on the application, and/or documentation on the macro function. The retrieval of the contextual content is performed before the word processing program executes another identified state. The retrieval module may be a module separate from the application.

The methods disclosed may be implemented as sets of instructions, through a single production device, and/or through multiple production devices. Further, it is understood that the specific order or hierarchy of steps in the methods disclosed are examples of exemplary approaches. Based upon design preferences, it is understood that the specific order or hierarchy of steps in the method can be rearranged white remaining within the scope and spirit of the disclosure. The accompanying method claims present elements of the various steps in a sample order, and are not necessarily meant to be limited to the specific order or hierarchy presented.

It is believed that the disclosure and many of its attendant advantages will be understood by the foregoing description, and it will be apparent that various changes may be made in the form, construction and arrangement of the components thereof without departing from the scope and spirit of the disclosure or without sacrificing all of its material advantages. The form herein before described being merely an explanatory, it is the intention of the following claims to encompass and include such changes.

What is claimed is:

1. A method for contextual documentation, comprising:
receiving an identified state of a first application by utilizing a second application, the second application being external to the first application, the identified state including a name and an associated set of topics, each topic of the associated set of topics includes a type and a key, the type including one of: a button, a screen, a task or a concept, the key including one of: a new button, a delete dialog, or a publishing concept;
determining contextual content to display based on the received identified state of the first application, including: selecting a contextual content generating module from amongst a plurality of contextual content generating modules of the second application to obtain the contextual content for display, the selected contextual content generating module being selected from amongst the plurality of contextual content generating modules based on an identity of a developer of the selected contextual content generating module, the plurality of content generating modules including a help module, a documentation module and a training module, the plurality of content generating modules collectively generating content configured to provide a help system, a documentation system and a training system;
utilizing a retrieval module of the second application to obtain the selected contextual content for display;
displaying the selected contextual content;
receiving a second identified state of the first application by utilizing the second application;
changing the contextual content to display by utilizing the second application based on the received second identified state of the first application; and
displaying the changed contextual content.

2. The method of claim 1, further comprising storing a list of all identified states of the first application.

3. The method of claim 2, further comprising querying the first application to determine the list of all identified states of the first application.

4. The method of claim 3, further comprising developing contextual content for at least one identified state of the first application from the list of all identified states of the first application.

5. The method of claim 3, further comprising associating already formed contextual content with at least one identified state of the first application from the list of all identified states of the first application.

6. The method of claim 1, further comprising developing contextual content for at least one identified state of the first application.

7. The method of claim 1, further comprising associating already formed contextual content with at least one identified state of the first application.

8. A non-transitory computer readable medium comprising computer readable instructions which, when executed, perform the steps of:
receiving an identified state of a first application by utilizing a second application, the second application being external to the first application, the identified state including a name and an associated set of topics, each topic of the associated set of topics includes a type and a key, the type including one of: a button, a screen, a task or a concept, the key including one of: a new button, a delete dialog, or a publishing concept;
determining contextual content to display based on the received identified state of the first application, including: selecting a contextual content generating module from amongst a plurality of contextual content generating modules of the second application from which to obtain the contextual content for display, the selected contextual content generating module being selected from amongst the plurality of contextual content generating modules based on an identity of a developer of the selected contextual content generating module, the plurality of content generating modules including a help module, a documentation module and a training module, the plurality of content generating modules collectively generating content configured to provide a help system, a documentation system and a training system;
utilizing a retrieval module of the second application to obtain the selected contextual content for display;
displaying the selected contextual content;
receiving a second identified state of the first application by utilizing the second application;
changing the contextual content to display by utilizing the second application based on the received second identified state of the first application; and
displaying the changed contextual content.

9. A method for making an application, comprising:
identifying at least one state to form at least one identified state, the at least one identified state including a name and an associated set of topics, each topic of the associated set of topics includes a type and a key, the type including one of: a button, a screen, a task or a concept, the key including one of: a new button, a delete dialog, or a publishing concept;
inserting broadcasting code at each of the at least one identified state;
broadcasting the at least one identified state to a content generating application, the content generating application being external to the application, the content generating application including a plurality of content generating modules, the content generating application configured to determine contextual content based on the at least one identified state the content generating application receives from the application, the content generating module configured to select a content generating module from amongst the plurality of content generating modules to obtain contextual content so that the contextual content is configured to be displayed, the selected content generating module being selected based on an identity of a developer of the selected content generating module, wherein the content generating application includes a retrieval module configured to obtain the selected contextual content for display; and
broadcasting a second identified state of the at least one identified state to the content generating application, wherein the content generating application is further configured to:
change the contextual content to be displayed based upon the second identified state of the at least one identified state; and
display changed contextual content.

10. The method of claim 9, wherein inserting broadcasting code at each of the at least one identified state further comprises:

inserting broadcasting code at each of the at least one identified state by utilizing an application development tooling.

11. The method of claim 9, further comprising providing data storage suitable for storing a list of the at least one identified state.

12. A contextual documentation system, comprising:
a processor configured for identifying at least one executing state of an application, for broadcasting a first identified executing state of the at least one identified executing state of the application, and for broadcasting a second identified executing state of the at least one identified executing state of the application;
at least one context generating application, external to the application, configured for receiving the first identified executing state of the application and determining contextual content to be displayed based on the first identified executing state of the application, the at least one context generating application including a plurality of contextual content generating modules, the plurality of contextual content generating modules including a help module, a documentation module and a training module, the at least one context generating application generating content for providing a help system, a documentation system, and a training system, wherein the at least one context generating application is further configured for receiving the second identified executing state, for changing the contextual content to be displayed based upon the second identified executing state, and for displaying changed contextual content;
an interface, communicatively coupled to the processor and the at least one context generating application, suitable for communicating the at least one identified executing state of the application between the processor and the at least one context generating application; and
a retrieval module, the retrieval module being communicatively coupled with the at least one context generating application, the retrieval module being configured for retrieving the contextual content determined by the at least one content generating application, the retrieval module being configured for retrieving the determined contextual content within a given runtime for the contextual documentation system, the retrieval module configured for selectively choosing between retrieving contextual content determined by a first contextual content generating module included in the plurality of contextual content generating modules or retrieving contextual content determined by a second contextual content generating module included in the plurality of contextual content generating modules, said selective choosing being based on an identity of a developer of the selected contextual content generating module.

13. The contextual documentation system of claim 12, further comprising a data store, communicatively coupled to the processor, suitable for recording and storing a list of the at least one identified executing state of the application.

14. The contextual documentation system of claim 13, further comprising information development tooling, communicatively coupled to the data store, suitable for querying the data store to determine the list of the at least one identified executing state of the application.

15. The contextual documentation system of claim 13, further comprising information development tooling suitable for developing contextual content for one or more identified executing states of the application from the list of the at least one identified executing state of the application.

16. The contextual documentation system of claim 13, further comprising information development tooling suitable for associating already formed contextual content with one or more identified executing states of the application from the list of the at least one identified executing state of the application.

17. The contextual documentation system of claim 12, further comprising information development tooling suitable for developing contextual content for the at least one identified executing state of the application.

18. The contextual documentation system of claim 12, further comprising information development tooling suitable for developing contextual content for the at least one identified executing state of the application.

19. The contextual documentation system of claim 12, further comprising a receiver module, communicatively coupled to at least one of the at least one context generating application, suitable for retrieving and displaying the contextual content determined by at least one of the at least one context generating application.

20. The contextual documentation system of claim 19, further comprising a receiver module, communicatively coupled to the context generating application, suitable for retrieving and displaying the changed contextual content determined by at least one of the at least one context generating application.

21. The contextual documentation system of claim 19, wherein the interface comprises at least one of a bus or broker.

* * * * *